Figure 1:
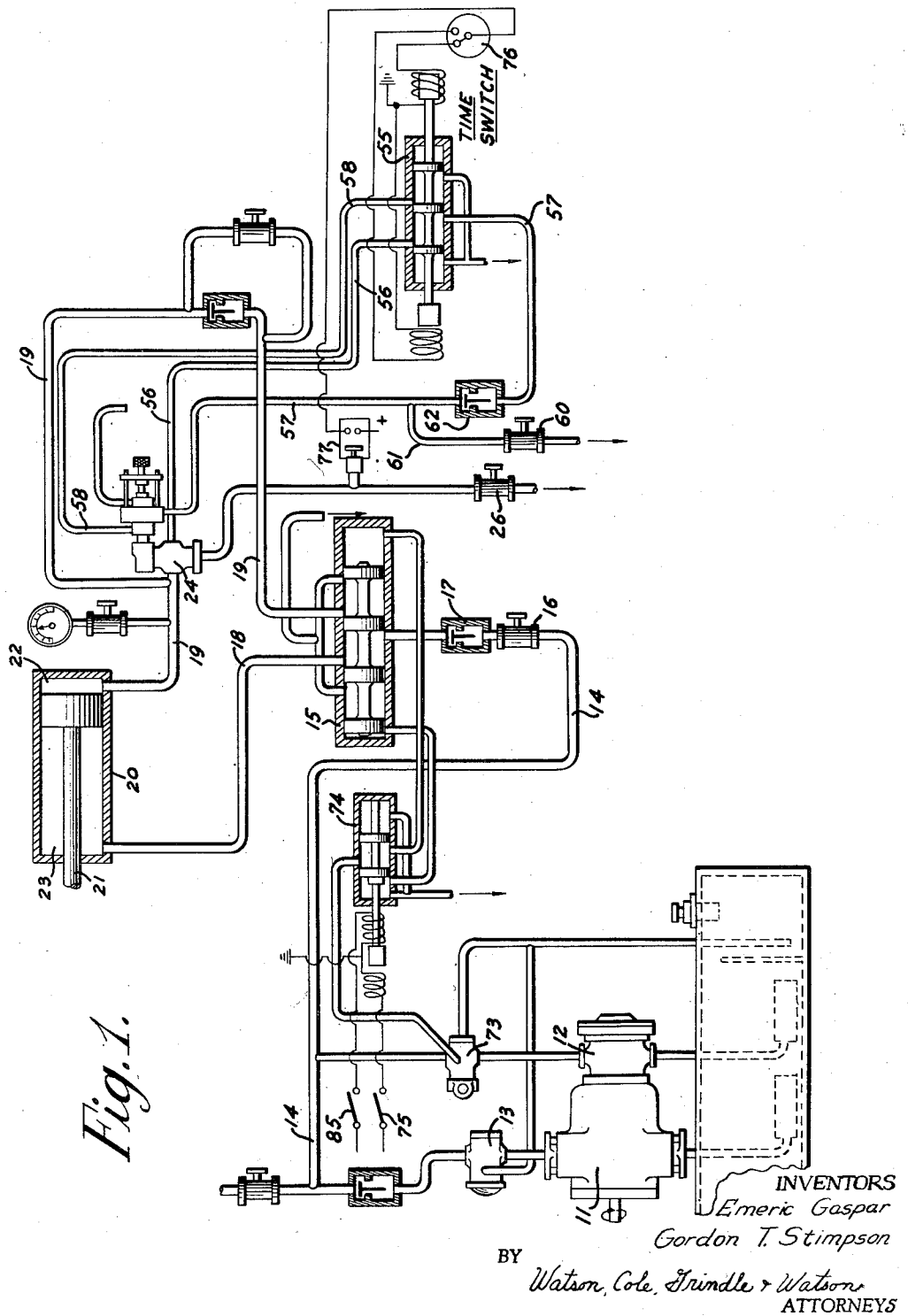

April 23, 1957 E. GASPAR ET AL 2,789,541
HYDRAULIC ACTUATING SYSTEM FOR INJECTION MOULDING MACHINE
Filed Jan. 25, 1954 2 Sheets-Sheet 1

INVENTORS
Emeric Gaspar
Gordon T. Stimpson
BY
Watson, Cole, Grindle & Watson
ATTORNEYS

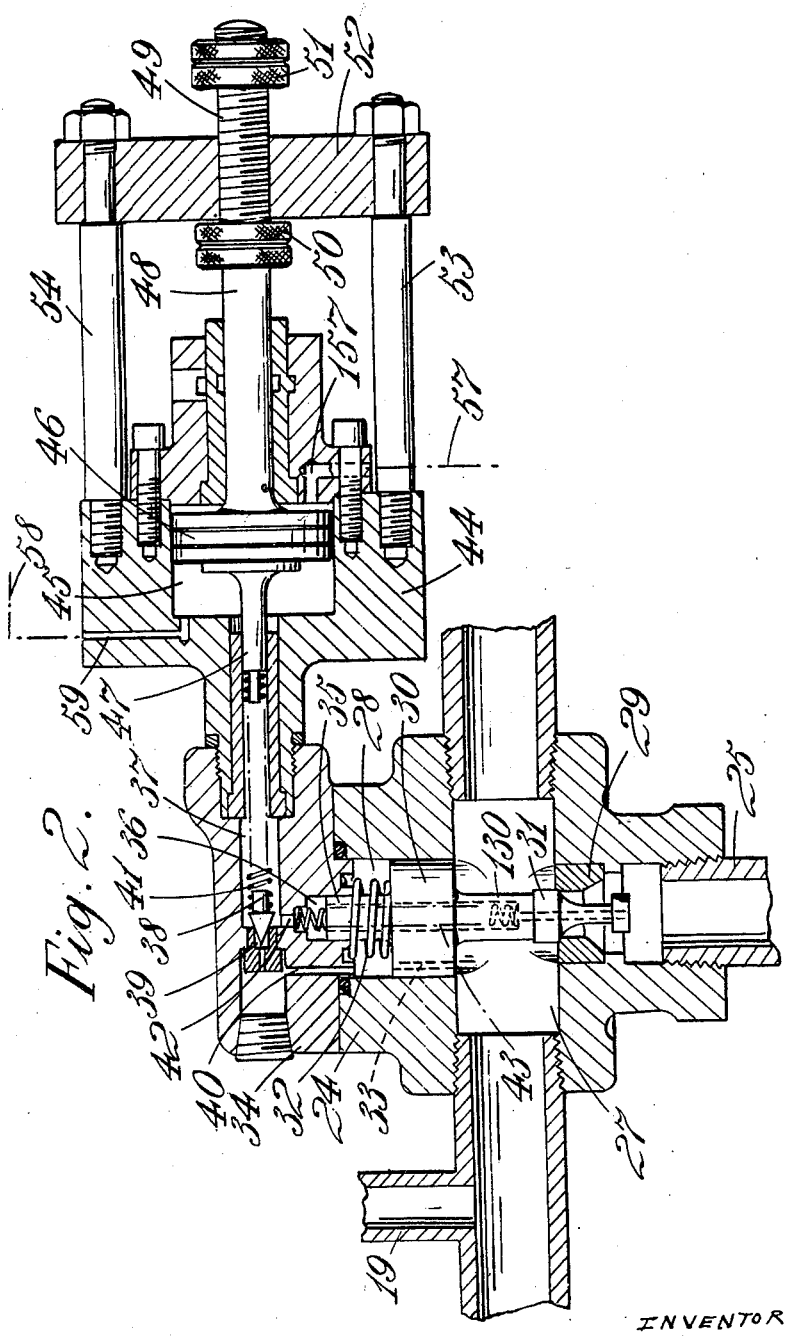

2,789,541

HYDRAULIC ACTUATING SYSTEM FOR INJECTION MOLDING MACHINE

Emeric Gaspar and Gordon Tribe Stimpson, Battersea, London, England, assignors to The Projectile & Engineering Company Limited, London, England, a British company Application January 25, 1954, Serial No. 405,898

Claims priority, application Great Britain January 26, 1953

5 Claims. (Cl. 121—38)

This invention comprises improvements in or relating to injection moulding machines. The invention relates to injection moulding machines of the type in which a hydraulic ram is employed to force plastic material from a heating chamber through a nozzle into a die. It is an object of the invention to provide an improved form of control for the hydraulic pressure whereby the cycle of operations necessary to complete any particular moulding can readily be arranged for by pre-setting simple adjustments on the control.

According to the present invention in an injection moulding machine of the type described, in the hydraulic supply line to the injection cylinder there is located a relief valve so that when the pressure in the injection cylinder reaches a predetermined maximum the relief valve opens to the drain, an operative connection is provided to a time switch such that upon the relief valve opening the time switch is set in operation and the time switch is connected in circuit with means for modifying the supply pressure to the injection cylinder. In this way by varying the setting of the time switch the period at which the maximum injection pressure is held can be readily modified at will and by varying the setting of the means for modifying the injection pressure the subsequent rate of variation of the injection pressure can be adjusted. Thus, for example, upon injection taking place the pressure in the injection cylinder rises to a maximum when the mould is filled. The time switch ensures that this maximum is held for an adequate time to ensure an initial set of the material in the mould under pressure adequate to obviate the production of any voids and thereafter the pressure can be allowed to fall away at a predetermined rate to a predetermined minimum, at which it is held before it is cut off and the mould opened. As the time interval at maximum pressure and the subsequent rate of fall of the pressure and the subsequent sustaining pressure are each required to be variable from one mould to another it is important to be able to adjust these three factors independently as above described.

The following is a description by way of example of one construction of control apparatus in accordance with the invention.

In the accompanying drawing Figure 1 is a diagram of hydraulic connections of the whole apparatus and Figure 2 is a detail of a valve for regulating the injection pressure.

The apparatus comprises two pumps 11, 12 for the supply of hydraulic pressure, both of which are motor driven. One, the pump 11, is the main pump with a large supply, and the other, pump 12, is a holding pump having a smaller output. The main pump 11 is provided with an unloader 13, but the holding pump 12 has only relief valve 73. The two pumps are connected in parallel to a main hydraulic supply line 14 which leads to a pilot-operated four-way valve 15 through a restricting valve 16 and non-return valve 17. The operation of valve 15 is controlled by push buttons 75—85 on the machine and pilot valve 74. From the pilot-operated valve 15 pipes 18, 19 run to the injection cylinder 20 of the machine and in one position of the valve the pressure supply is connected to the head end 22 of the injection cylinder moving the ram 21 forward, and in the other position of the valve the pressure supply is connected to the rod end 23 of the injection cylinder to return the ram. Between the pilot-operated valve and the injection cylinder there is located in a branch on the pipe line 19 to the head end of the injection cylinder a pressure regulating relief valve 24, one purpose of which is to open and allow hydraulic pressure fluid from the pipe line to drain away when the pressure reaches its maximum value. The drain 25 from this valve has a resistor 26 in it and between the valve and the resistor is a branch to a pressure switch 77. As soon as the relief valve 24 opens, the pressure rises in the drain between the valve and the resistor and operates the pressure switch to close an electrical circuit. The electrical circuit is connected to a time switch hereinafter referred to.

The relief valve is shown in Figure 2 and is constructed as follows:

The body of the valve has a passage 27 straight through it for the hydraulic fluid and this is crossed by a transverse bore 28, in which is located on one side of the through passage a relief-valve seating 29. The transverse bore outside the seating is connected to the drain 25 and pressure switch 77. On the other side of the through passage from the seating the transverse bore 28 is fitted with a piston 30 and the piston carries a rod 130 which passes across the bore to a relief valve-member 31 bearing on the seating 29 and normally closing it. The piston is backed up by a return-spring 32 and a small diameter leak passage 33 extends through the piston into the space around the spring. The back end of the transverse bore is closed by a cover 34. A trunk-like extension 35 from the piston, which is however of much smaller diameter than the piston, enters a recess 36 in the cover 34. The spring 32 surrounds the trunk-like extension. Within the thickness of the cover 34, behind the recess 36, is a needle-valve bore 37 at right angles to the transverse bore 28 in the relief-valve body. In the needle-valve bore is a needle-valve 38 which bears on a seating 39 and the seating is connected by a narrow passage 40 with the space (in the relief-valve body) which contains the return spring 32. The needle-valve is urged on to its seating by a spring 41 and when the needle-valve opens it admits pressure fluid into the bore 37, in the cover and thence by a passage 42 into the space within the trunk-like extension 35 of the piston 30. From here there is a passage 43 through the centre of the piston and the relief-valve-member into the drain.

Operation of the relief valve as so far described is as follows:

The pressure from the pipe line 19 which leads to the injection cylinder has access through the restricted passage 33 in the piston 30 and the passage 40 in the cover to the needle valve 38. As long as the needle valve remains shut the hydraulic pressure in the spring chamber 28 behind the piston is equal to the hydraulic pressure in the pipe line and the relief valve 31 remains closed. When the hydraulic pressure reaches the point at which it forces the needle-valve 38 open against its spring 41, the hydraulic fluid in the chamber behind the piston can escape past the needle-valve and through the passage 42 and passage 43 in the centre of the piston 30 to the drain 25. The pressure behind the piston 30 therefore falls and as soon as it has fallen sufficiently the pressure in the through-passage 27 of the relief-valve is able to force back the piston and open the relief-valve-member 31. The pressure at which this occurs is determined by the strength of the spring 41 behind the needle-valve and as soon as the needle-valve closes again the relief-valve will close.

In order to be able to modify the strength of the spring 41 behind the needle-valve a progressive pressure-reducing valve is provided which consists of a fitting 44 screwed into the cover 34 of the relief-valve in line with and behind the needle-valve. This fitting contains a cylinder 45, coaxial with the needle-valve, in which is a pressure-reducing piston 46. The piston carries a plunger 47 which extends out of the cylinder towards the needle-valve 38 and bears on the back end of the needle-valve spring 41. From the other face of the piston there extends a piston rod 48 which passes out of the cylinder and terminates in a screwed portion 49 which carries two stop-nuts 50, 51. The stop-nuts are located one on either side of a stop-plate 52 and the stop-plate is supported from the exterior of the fitting 44 on a pair of posts 53, 54. By altering the position of the stop-nuts the length of stroke of the pressure-reducing piston 46 and the points at which the stroke begins and ends can be adjusted.

A branch pipe 56 is connected from the bore 27 of valve 24 (and therefore acts as a branch from pipe 19) to a double solenoid-operated valve 55 which controls the operation of the valve 24 and is operated by a time switch 76. When the operator presses the push button 75 to move the pilot-operated valve 15 into the position where the pump pressure is connected from line 14 to the injection cylinder by pipe 19, system pressure is simultaneously applied via pipe 56 and the solenoid-operated valve to a pipe line 57 connected with the cylinder of the pressure-reducing valve through a passage 157 (Figure 2) on the side of the piston 46 thereof which is nearer the stops 50, 51. This moves the piston in the latter to a position in which it compresses, as far as the stop 51 will allow, the spring 41 behind the needle-valve 38, and so secures maximum injection pressure.

When in the course of injection, maximum pressure allowed by the stops is reached, the relief-valve 31 opens to maintain system pressure at this level. At this instant pressure begins to build up in the drain line 25 from this valve, and almost at once closes the contacts of the pressure switch 77, which in turn starts the time switch 76. The setting of this time switch determines the period during which the maximum injection pressure allowed by stop 51 is maintained. At the end of this period the time switch reverses the energization and thus the position of the solenoid-operated valve 55. This changes the pressure supply through valve 55 over to line 58, which is connected by passage 59 (Figure 2) to the other side of the pressure-reducing piston 46. At the same time the pressure on the side of the piston 46 farthest away from the relief-valve is allowed to drain away at a predetermined rate through a restrictor 60 on a branch 61 from pipe 57. The valve 62 in pipe 57 is a non-return valve. Slow movement of the pressure-reducing piston in a direction away from the relief-valve results, and causes the spring 41 compressing the needle-valve to be relaxed gradually which in turn progressively reduces the pressure setting of the relief-valve 31 and reduces the pressure on ram 21.

When the pressure was first applied to ram 21, this ram made its stroke, injecting the moulding material into the die; as soon as the die had been filled the pressure rose (to the maximum allowed by the stops as already referred to) and the main pump 11 cut out by the operation of its unloader 13 in known manner, leaving the smaller pump 12 to continue to supply hydraulic fluid to the pipe line. The relief-valve 24 then held the pressure as already described at the maximum value during the operation of the time switch, which at the end of the predetermined setting time operated valve 55 and allowed the piston of the progressive pressure-reducing valve to move away gradually from the needle-valve. It will thus be understood that, as the pressure on the needle-valve spring 41 decreases the relief-valve opens enough to reduce the pressure in the head end 22 of the injection cylinder 20 gradually. When the piston of the pressure-reducing valve reaches the limit of its movement set by the stop 50 the injection pressure ceases to fall and is maintained at this pressure for any predetermined period.

It will be seen that by altering the stop-nuts 50, 51 on the pressure-reducing valve 24 the upper and lower limits of pressure in the cycle can be modified. By altering the duration of operation of the time switch the time at which maximum pressure is held can be modified, and by altering the restriction valve 60 in the branch 61 from the pipe 57 leading to the pressure-reducing valve, the rate of fall of pressure can be modified.

The valve 73 on the outlet of the pump 12 is a relief valve which opens in the event of the pressure rising unduly from any cause. It will be understood that the pipe line 14 is connected also to other parts of the press which require to be operated and that the controls for these may be inter-linked with those described for the ram in any way which is usual or is considered desirable.

We claim:

1. In an injection moulding machine of the type having an hydraulic cylinder and plunger to operate an injection plunger, the provision of control means comprising in combination a hydraulic pressure supply, a supply line to the hydraulic cylinder aforesaid, an electric time switch, a pressure switch connected to the supply line so that on the pressure therein attaining a predetermined value the pressure switch will operate; electrical connections therefrom to the time switch to operate it, a pressure release valve connected to the hydraulic supply line having pressure-release regulating-means to regulate the rate of all of pressure in said line, an electro-magnetically operating valve to set the release means in operation and an electrical connection from the time switch to the said valve which sets the release means in operation, so that the time switch operates the same after a predetermined interval.

2. An injection moulding machine as claimed in claim 1 wherein the said pressure-release regulating means for the release valve comprises a spring-pressed needle-valve and means to regulate the spring-pressure thereon.

3. An injection moulding machine as claimed in claim 2 wherein the means to regulate the spring-pressure comprise a spring-operating piston, connected to the said needle valve and fluid-pressure supply conduits to said piston from the said electro-magnetically operated valve whereby on application of pressure fluid the said piston recedes and reduces the effective pressure of the spring.

4. An injection moulding machine as claimed in claim 1 wherein the said release valve comprises in combination a valve body having a pipe connection to a chamber for pressure-fluid, a relief valve seating in said chamber, a relief valve member therefor, a cylinder containing a relief-operating piston operatively connected to said relief-valve member to actuate it, a restricted passage to the cylinder from the chamber for pressure-fluid, an outlet from the cylinder, a spring urged needle-valve in said outlet and fluid pressure operated piston means for regulating the tension of the spring for the said needle valve.

5. A release valve as claimed in claim 4 wherein the relief operating piston is rigidly connected to the relief valve to move as one therewith and the outlet from the cylinder comprises a passage which extends through said piston and relief valve.

References Cited in the file of this patent

UNITED STATES PATENTS

| 2,192,778 | Stacy | Mar. 5, 1940 |
| 2,527,943 | Lee | Oct. 31, 1950 |
| 2,617,389 | Munschauer | Nov. 11, 1952 |
| 2,636,509 | Cizek | Apr. 28, 1953 |
| 2,736,296 | Romine et al. | Feb. 28, 1956 |